(12) United States Patent
Ruan

(10) Patent No.: US 10,293,712 B2
(45) Date of Patent: May 21, 2019

(54) RECLINE ADJUSTMENT ASSEMBLIES FOR A VEHICLE SEAT

(71) Applicant: Ford Global Technologies LLC, Dearborn, MI (US)

(72) Inventor: Alex Ruan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 15/789,371

(22) Filed: Oct. 20, 2017

(65) Prior Publication Data

US 2018/0111514 A1    Apr. 26, 2018

(30) Foreign Application Priority Data

Oct. 25, 2016 (CN) .......................... 2016 1 0947990

(51) Int. Cl.
| | | |
|---|---|---|
| B60N 2/22 | (2006.01) | |
| B60N 2/02 | (2006.01) | |
| B60N 2/06 | (2006.01) | |
| B60N 2/20 | (2006.01) | |

(52) U.S. Cl.
CPC ......... B60N 2/2245 (2013.01); B60N 2/0232 (2013.01); B60N 2/06 (2013.01); B60N 2/206 (2013.01); B60N 2/2231 (2013.01); *B60N 2002/0236* (2013.01)

(58) Field of Classification Search
CPC ...... B60N 2/2245; B60N 2/0232; B60N 2/06; B60N 2/206; B60N 2/2231

USPC ........................................... 296/65.16, 65.17
See application file for complete search history.

(56) References Cited

U.S. PATENT DOCUMENTS

| | | | |
|---|---|---|---|
| 7,819,478 B2 | 10/2010 | Halbig et al. | |
| 8,662,561 B2 * | 3/2014 | Runde ................... | B60N 2/206 |
| | | | 296/65.03 |
| 9,616,778 B1 * | 4/2017 | Bates ..................... | B60N 2/146 |

FOREIGN PATENT DOCUMENTS

| | | |
|---|---|---|
| DE | 102005054491 B3 | 5/2007 |
| EP | 0614781 A1 | 9/1994 |
| EP | 0985575 A2 | 3/2000 |
| FR | 2828148 A1 | 2/2003 |
| FR | 2884771 A1 | 10/2006 |
| FR | 3028464 A1 | 5/2016 |

OTHER PUBLICATIONS

"Rear Seat Adjustment"; http://www.hyundaisantafemanual.com/santafe-20-rear_seat_adjustment.html; Hyundai Santa Fe.

* cited by examiner

*Primary Examiner* — Joseph D. Pape
(74) *Attorney, Agent, or Firm* — Vichit Chea; Kolitch Romano, LLP

(57) ABSTRACT

A recline adjustment assembly for a rear seat in a vehicle comprises a latch device disposed on a seatback of the seat; and a strike pivotally connected to a vehicle body behind the seatback and locked in the latch device at a use position. The latch device moves along the strike to adjust a reclining angle of the seatback as the strike pivots by a driving device.

20 Claims, 6 Drawing Sheets

RECLINE ADJUSTMENT ASSEMBLIES FOR A VEHICLE SEAT

RELATED APPLICATION

This application claims the benefit of Chinese Patent Application No.: CN 201610947990.9 filed on Oct. 25, 2016, the entire contents thereof being incorporated herein by reference.

FIELD

This present application relates a recline adjustment assembly for a seat of a vehicle, which adjusts a reclining angle of the seatback via movement of a strike connected to a vehicle body behind the seat and driven by a driving device.

BACKGROUND

Today, rear seats in some luxurious vehicles are designed in 40-20-40 configuration. Generally, the rear seat is adjustable at four directions, that is, forward or backward adjustment of reclining angle of a seatback and forward or backward movement of the seat to provide comfortable positions for users.

However, the rear seats are commonly connected to a seat cushion via two recline adjustment assemblies disposed on the seat. Such recline adjustment assembly is complicate in structure, which results in increase of manufacturing cost for the rear seat.

For example, Europe patent EP0614781 A1 discloses a rear seat in a vehicle with the structure described above which has a drawback of high manufacturing cost.

SUMMARY

According to one aspect of the present disclosure, a recline adjustment assembly for a seat of a vehicle is provided. A recline adjustment assembly for a seat in a vehicle comprises a latch device disposed on a seatback of the seat; and a strike pivotally connected to a vehicle body is positioned behind the rear seat. The strike is selectively locked in the latch device, and the latch device moves along the strike to adjust a reclining angle of the seatback as the strike pivots.

In one embodiment, the strike is curved, in a plane substantially perpendicular to a main surface of the seat back and have both an upper end and a lower end facing the vehicle body. The first end of the strike is connected to the vehicle body via a first pivot, and the second end of the strike is connected to a driving device on the vehicle body via a second pivot.

In another embodiment, the driving device includes a motor fixed on the vehicle body and a worm connected with a worm gear on the motor.

In another embodiment, the worm is connected to the second pivot via a bushing, and a bearing is disposed between the worm and the bushing.

In another embodiment, the latch device includes a base and a hook-shaped lock tongue pivotally connected to the base, and wherein the hook-shaped tongue and the base forms a lock hole for the strike to pass through.

In another embodiment, the lock hole extends substantially in a lengthwise direction of the seatback.

In another embodiment, the latch device further includes a release mechanism connected to the hook-shaped lock tongue to move the hook-shaped lock tongue open to release the strike.

In another embodiment, the latch device is disposed on a rear and top center portion of the seatback.

According to another aspect, a rear seat in a vehicle comprises a bottom bracket moveable forward and back relative to a vehicle floor; a seatback connected to the bottom bracket via a hinge connection; a latch device disposed adjacent to a top and rear portion of the seatback; a strike pivotally connected to a vehicle body and a driving device coupled to the strike. The strike is received in the latch device at a use position of the rear seat, and the latch device slides along a length of the strike to adjust a reclining angle of the seatback as the strike pivots by the driving device.

In one embodiment, the vehicle body includes a package tray of a rear window. The strike has a curved shape protruded toward the seatback, and positioned at a plane substantially perpendicular to a main surface of the seatback. A first end of the strike is connected to a base on the package tray via a first pivot, and a second end of the strike is connected to the driving device disposed on the package tray via a second pivot.

In another embodiment, the package tray includes an inner surface toward a vehicle floor, and the driving device is disposed on the inner surface.

In another embodiment, the driving device includes a motor fixed on the inner surface, a worm connected to a worm gear on the motor and a bushing connected to the worm via a bearing.

In another embodiment, the bushing passes through a hole on the package tray to be connected with the second pivot.

In another embodiment, the strike passes through the lock hole substantially in a direction of the vehicle height.

In another embodiment, one of the vehicle floor and the bottom bracket includes a track extending in a longitudinal direction of a vehicle, and another one of the vehicle floor and the bottom bracket includes a rail, and the rail is received in the track and slidable in the track.

According to another aspect, a recline adjustment assembly for a rear seat in a vehicle comprises a latch device disposed on a seatback of the rear seat; a strike pivotally connected to a rear window package tray and received in the latch device at a use position; and a driving device to move the strike forward and backward at a longitudinal direction of the vehicle. The latch device slides along a length of the strike to adjust a reclining angle of the seatback as the strike moves by the driving device.

In one embodiment, the driving device includes a motor, a warm gear on the motor and a warm engaged with the warm gear, wherein the strike has a U-shape that opens to the package tray. A lower end of the strike is connected to the package tray and an upper end is coupled to the warm of the driving device.

In another embodiment, the latch device is disposed adjacent to a top surface of the seatback and includes a hook-shaped lock hole to receive and release the strike, and wherein a central axis of the lock hole is substantially parallel to a main surface of the seat back.

In another embodiment, the reclining angle decreases as the latch device moves toward the upper end of the strike and the reclining angle increases as the latch device moves toward the lower end of the strike.

In another embodiment, the latch device includes a releasing mechanism to pull the strike out from the lock hole such that the rear seat is rotatable to a folded position.

The recline adjustment assembly of the present disclosure adjusts a reclining angle of a vehicle seatback via a simply cooperation of the strike and a latch device. That is, the latch device moves along a length of the strike as the strike pivots to adjust the reclining angle, which achieves adjustment of reclining seatback angle with a low manufacturing cost. A movable connection between the latch device and the strike, and a movable connection between the rail and the track on the bottom of the seat make a four-way adjustment of the vehicle seat, that is, two-way reclining angle adjustment of the seatback and two-way forward and back adjustment of the bottom bracket.

DESCRIPTION OF DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed recline adjustment assemblies and seats will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various recline adjustment assemblies and seats are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
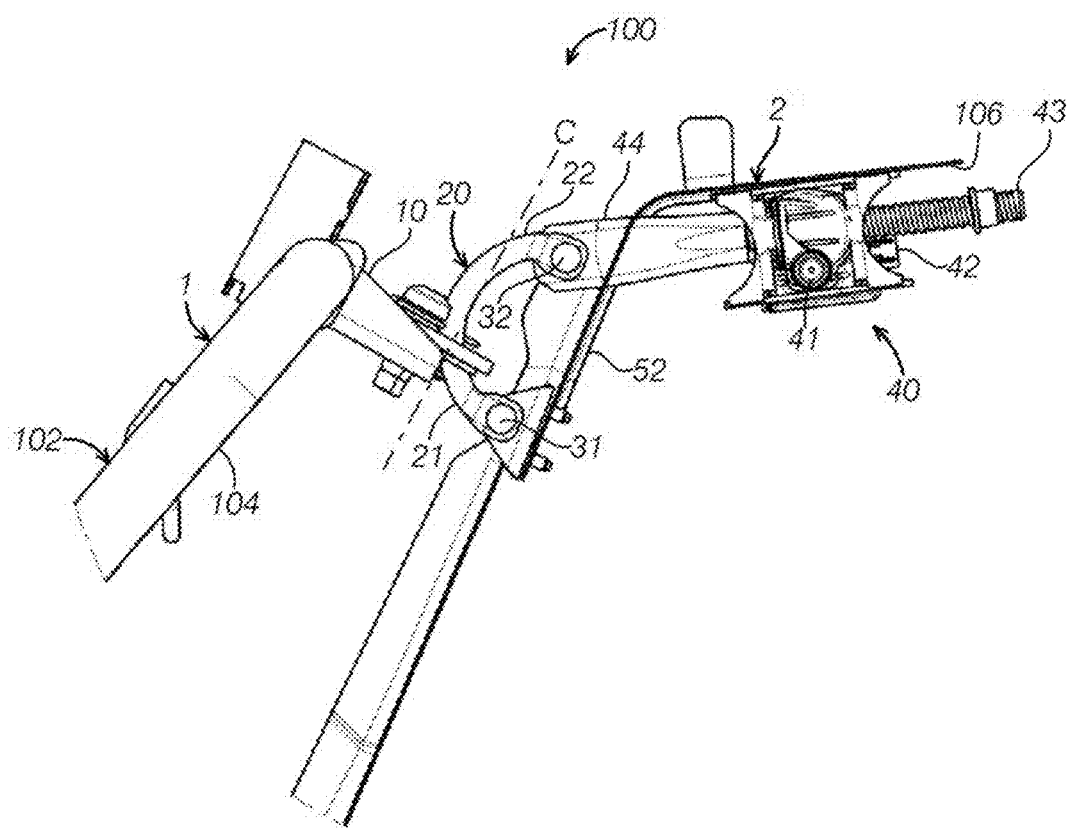
FIG. 1 is a schematic diagram of a recline adjustment assembly at a first state according to one embodiment of the present disclosure.
Figure 2:
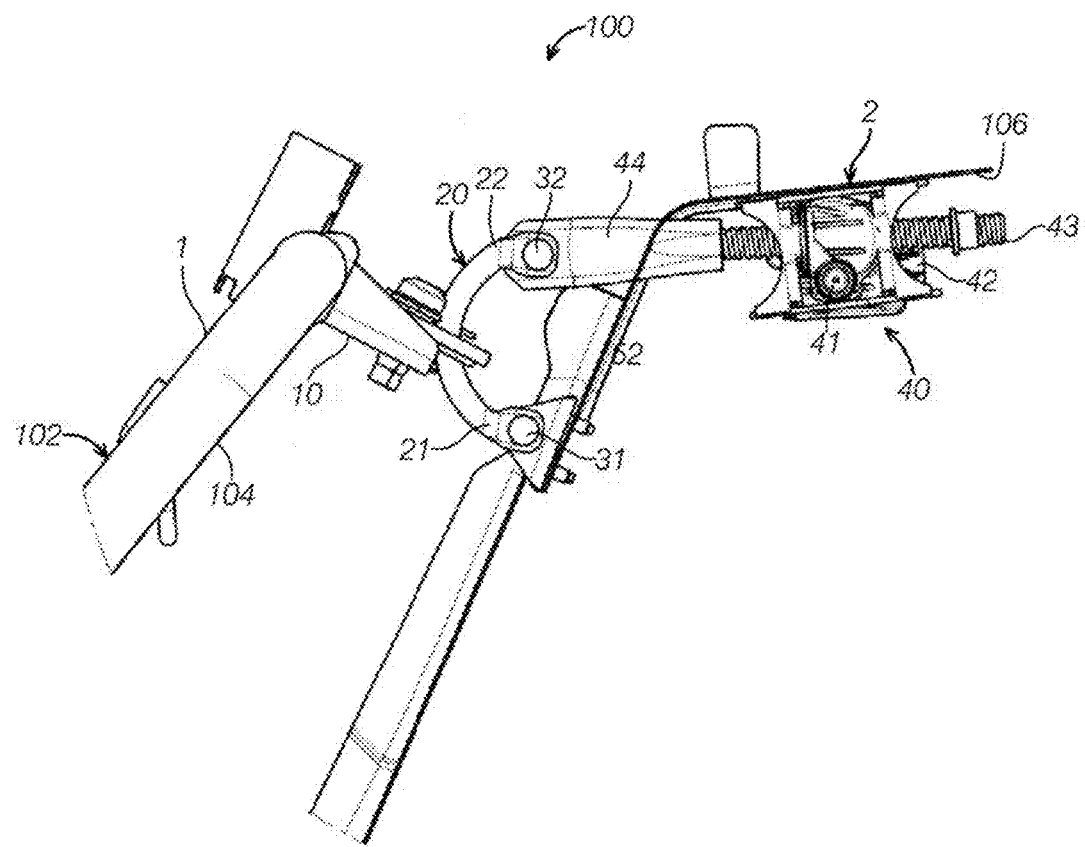
FIG. 2 is a schematic diagram of the recline adjustment assembly in FIG. 1 at a second state.
Figure 3:
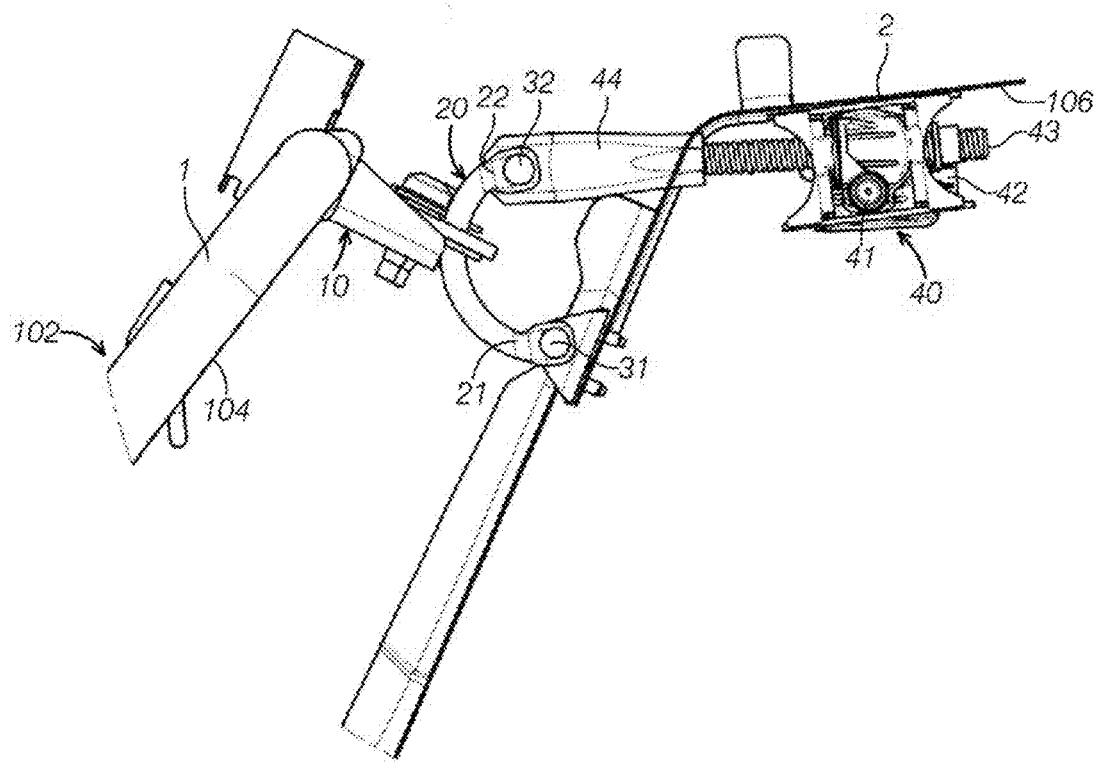
FIG. 3 is a schematic diagram of the recline adjustment assembly in FIG. 1 at a third state.

Referring to FIGS. 1 to 3, one aspect of the present invention provides a recline adjustment assembly 100 for a seat 102. The seat 102 may be a rear seat of a vehicle. The recline adjustment assembly 100 comprises a latch device 10 connected to a seatback 1 of the vehicle seat 102; a strike 20 pivotally connected to a vehicle body 2. In some embodiments, the latch device 10 and the strike 20 may be disposed behind the seatback 1. At least a portion of the strike 20 is selectively locked in the latch 10, and the latch device 10 moves with the strike 20 to adjust a reclining angle of the seatback 1 as the strike 20 pivots. The reclining adjustment assembly 100 of the present invention adjusts a reclining angle of the seatback 1 when the latch device 10 moves along the strike 20 or along a length of the strike 20 as the strike 20 pivots. That is, the reclining angle of the seatback 1 can be adjusted via a simple cooperation of the latch device 10 and the strike 20 and thus the recline adjustment assembly has a simple structure and has a low cost.

FIGS. 1 to 3 are schematic diagrams, illustrating that the strike 20 pivots toward the seatback 1 as a worm 43 moves forward to decrease a reclining angle of the seatback 1. In some embodiments, the strike 20 is configured to have two ends facing the vehicle body 2. In the depicted embodiment, the strike 20 may have a curved shape or a U-shape. The curved strike 20 may protrude toward the seatback 1 or the U-shape opens to the vehicle body 2 behind the seatback 1. The strike 20 may be positioned in a plane P that is substantially perpendicular to a main surface 104 of the seatback 1. A first end 21 of the strike 20 is coupled to the vehicle body 2 via a first pivot 31, and a second end 22 of the strike 20 is coupled to a driving device 40 on the vehicle body 2 via a second pivot 32. The first end 21 may be a lower end and the second end 22 may be an upper end. In the depicted embodiment, the strike 20 is formed to have a U shape. In FIG. 1, a bottom of the U-shape strike is locked in the latch device 10. The driving device 40 drives the strike 20 to rotate around the first pivot 31 to slide the strike 20 in the lock hole of the latch device 10. In other words, the movement of the strike 20 enables the latch device 10 to slide along a length of the strike 20. In the depicted embodiment, the strike 20 has a curved shape and the length refers to a curved path. It should be appreciated that the strike 20 may be formed in other appropriate shapes to easily slide and adjust the reclining angle of seatback.

Continuing with FIGS. 1 to 3, the driving device 40 includes a motor 41 fixed on the vehicle body 2 and a worm 43 connected with a worm gear 42 on the motor 41. The motor 41 drives the worm gear 42, and the worm gear 42 meshes with the worm 43 to drive the worm 43 forward or backward indirectly. Movement of the worm 43 drives the strike 20 to rotate around the second pivot 32 and rotate the first pivot 31 simultaneously to move the strike 20 forward or backward relative to the seatback 1. The strike 20 slides in the latch device 10 to cause the movement of the latch device 10, which rotate seatback 1 relative to a bottom bracket 4 to recline the seatback 1 and thus the reclining angle of the seatback 1 can be adjusted. It should be understood that the driving device 40 can be configured with other mechanisms to drive the strike 20.

Continuing with FIGS. 1 to 3, the worm 43 is connected to the second pivot 32 via a bushing 44, and a bearing is disposed between the worm 43 and the bushing 44. With configuration of the bushing 44 and bearing, the rotation of the worm 43 around its axis will not deliver a torque to the second pivot 32 and strike 20, that is, the torque is dissipated on the bushing 44 and bearing.

Figure 4:
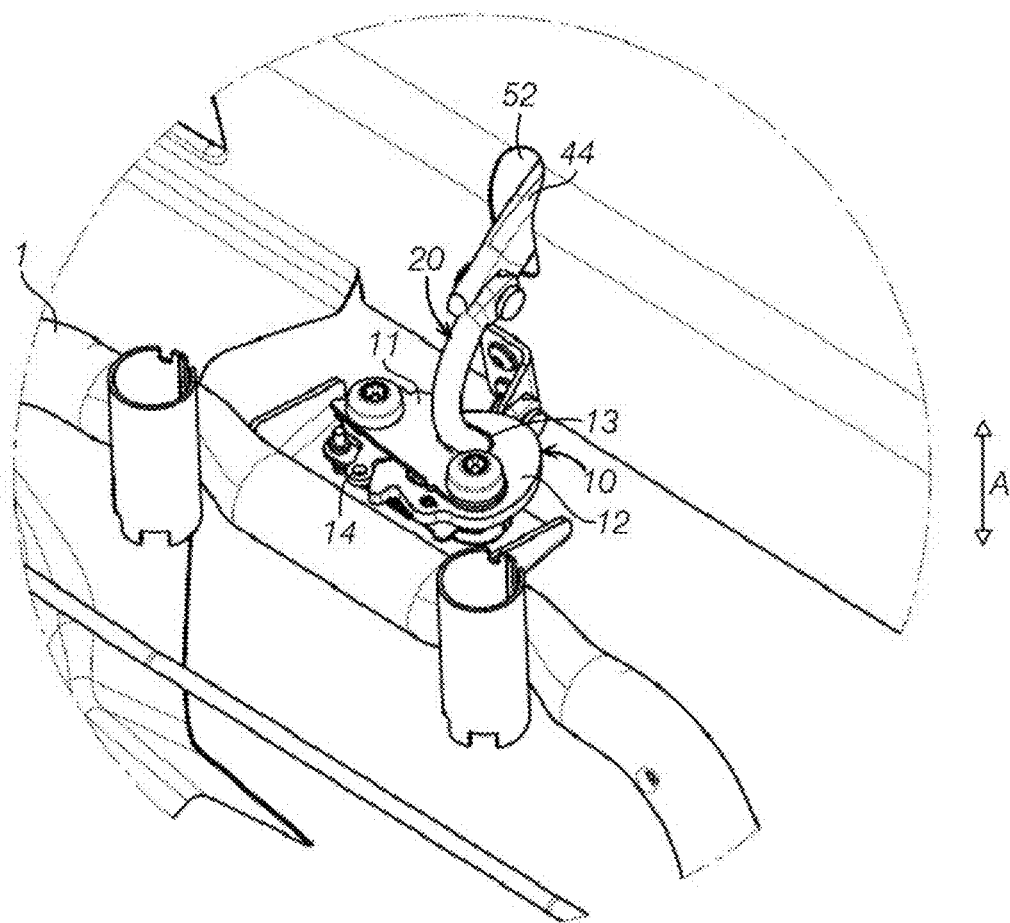
FIG. 4 is a partial enlarged view of a recline adjustment assembly of the present disclosure.

Referring to FIG. 4, the latch device 10 includes a base 11 and a hook-shaped tongue 12 pivotally connected to the base 11. The hook-shaped tongue 12 and the base 11 forms a lock hole 13 for the strike 20 to allow the strike 20 to pass through while received and connected to the latch device 10 at a locked position. The locked position refers to a position that the strike cannot be released. At the locked position, the lock hole 13 may be fully closed or may have a small clearance between an end of the hook-locked tongue 12 and the base 11. An extending direction of the lock hole 13 is in a direction A of a vehicle height. The direction A of the vehicle height is a direction from a roof to bottom of the vehicle. The lock hole 13 extending along the direction A of the vehicle height makes the extending direction of the strike 20 the same as the direction A of the vehicle height. Referring to FIG. 1, in some embodiments, a central axis C of the lock hole 13 may be substantially parallel to the main surface 104 of the seatback 1. The term "substantially parallel" may include an angle to the main surface 104 of the seatback in a range of 0 to 20 degrees. Guided by this direction, the reclining angle of the seatback 1 can be adjusted. Turning back to FIG. 4, a release mechanism 14 may be included to open the hook-shaped tongue to unlock the strike. Any appropriate release mechanism used in the art such as a cable or a pull rod may be used to move the hook-shape to a position to unlock or release the strike 20.

Referring to FIGS. 1-3, the latch device 10 is disposed on a rear of the seatback 1. Referring to FIG. 4, the latch device 10 is disposed on a top center portion of the seatback 1. Such configuration enables a pivot connection of the seatback 1 to the bottom bracket 4, In this way the reclining angle of the 1 can be adjusted with a short torque arm and the manufacturing cost is low.

Turning back to FIGS. 1 to 3, a process of operation of the recline adjustment assembly 100 is illustrated. In a first state shown in FIG. 1, the worm 42 almost does not extend toward the seatback 1. The strike 20 accordingly does not pivot toward to the seatback 1. The lock hole of the latch device 10 is located substantially under a lower portion of the striker 20. The reclining angle of the seatback 1 is maximum at the first state.

In a second state shown in FIG. 2, the worm 43 extends partially toward the seatback 1 with the rotation of the motor 41 or the worm gear 42. The worm gear 42 is located at a middle position of the warm 43. The strike 20 accordingly rotates around the pivot 31 and slides in the latch device 10 to rotate seatback 1 forward. The lock hole 13 of the latch device 10 is located substantially at the middle portion of the strike 20. The reclining angle of the seatback 1 is reduced at the second state compared to the first state shown in FIG. 1.

In a third state shown in FIG. 3, the worm 43 continues to move toward to the seatback 1, and the worm gear 43 extends further from the driving device. The pivotal angle of the strike 20 reaches maximum. The lock hole 13 of the latch device 10 is located adjacent to a top of the strike 20 and thus the seatback continues rotating forward. The reclining angle of the seatback 1 is minimum at the third state. To increase the reclining angle of the seatback 1, the process as described above is operated reversely. In the reclining adjustment, the reclining angle of the seatback 1 decreases as the latch device 10 moves toward the upper end 22 of the strike and the reclining angle increases as the latch device 10 moves toward the lower end 21 of the strike.

Figure 5:
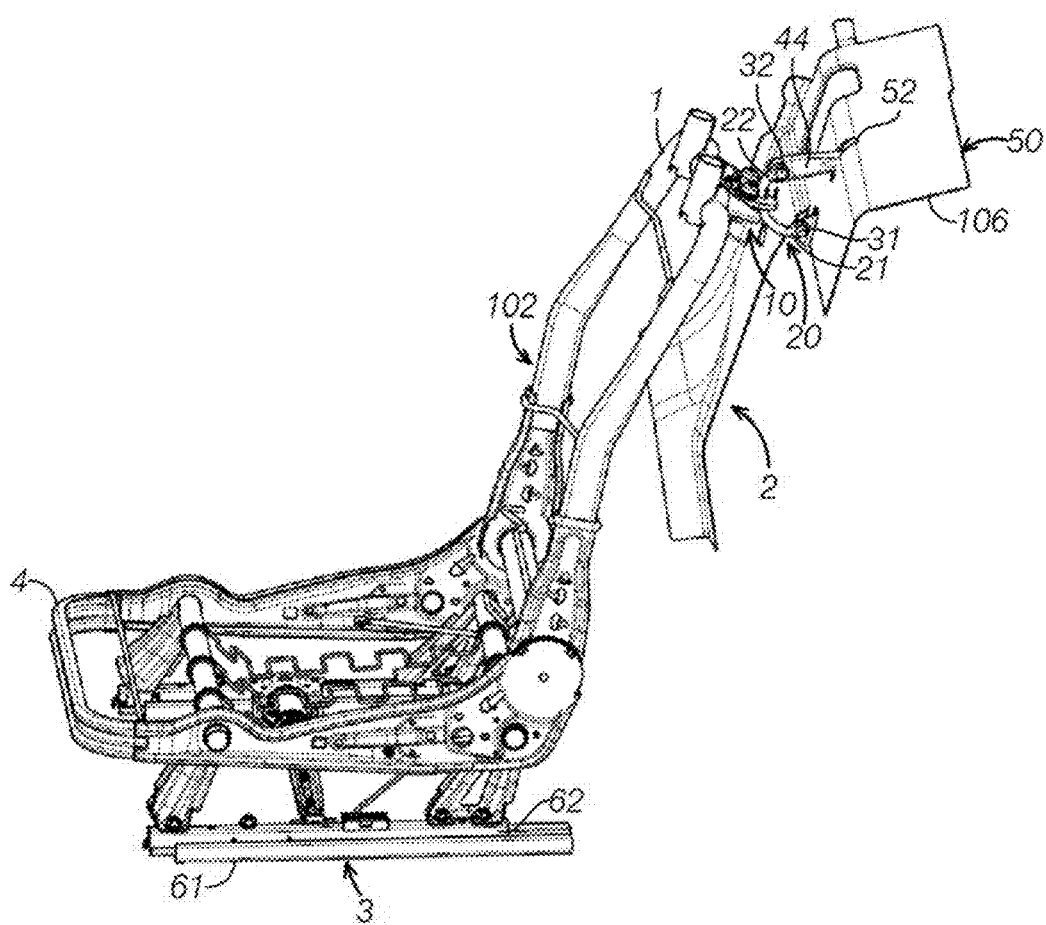
FIG. 5 is a schematic diagram of a rear seat of a vehicle at a locked position according to one embodiment of the present disclosure.

Referring to FIG. 5, another aspect of the present disclosure provides a rear seat 102 in a vehicle. The rear seat 102 comprises a bottom bracket 4 moveable forward and back relative to a vehicle floor 3; a seatback 1 connected to the bottom bracket 4 via a hinge connection; a latch device 10 disposed on a top portion of the seatback 1; a strike 20 pivotally connected to a vehicle body 2. The strike 20 is locked in the latch device 10. In other words, the strike 20 is received and secured in a lock hole of the latch device 10. The latch device 10 moves along a length of the strike 20 to cause a rotation of the seatback 1 and thus adjust a reclining angle of the seatback 1 as the strike 20 pivots.

In the depicted embodiment, the vehicle body 2 includes a rear window package tray 50. A lower end 21 of the strike 20 is connected to a base 51 of the package tray 50 via a first pivot 31, and an upper end 22 of the strike 20 is connected to a driving device 40 disposed on the package tray 50 via a second pivot 32. The vehicle floor 3 includes a track 61 extending in a longitudinal direction of the vehicle (i.e., a direction from a vehicle front to a vehicle rear), and the bottom bracket 4 includes a rail 62 received in the track 61. Alternatively, the bottom bracket 4 may include a rail and the vehicle floor 3 may include a track. It should be understood that the strike 20 slides in the latch device 10 due to the changed position of the bottom bracket 4 when the bottom bracket 4 moves forward or backward. That is, even the driving device 40 does not actuate the strike 20 to rotate, the reclining angle is indirectly adjusted. Thus, the reclining angle of the seatback is adjusted in multiple ways.

Continuing with FIG. 5 and with further reference to FIG. 4, the package tray 50 includes an inner surface 106 that forms a housing for the driving device 40. The inner surface 106 refers to a surface not visible to a user. The driving device 40 is disposed on the inner surface 52. The bushing 44 passes through a hole 52 on the package tray 50 to be connected with the second pivot 32. A better appearance is provided when the driving device 40 is concealed behind the package tray 50.

Continuing with FIG. 5 and with further reference to FIGS. 1-4, the driving device 40 includes a motor 41 secured on the inner surface 106 of the package tray, a worm 43 connected to a worm gear 42 on the motor 41 and a bushing 44 connected to the worm 43 via a bearing. The strike 20 goes through the lock hole 13 of the latch device 10 substantially along the direction A of the vehicle height.

Figure 6:
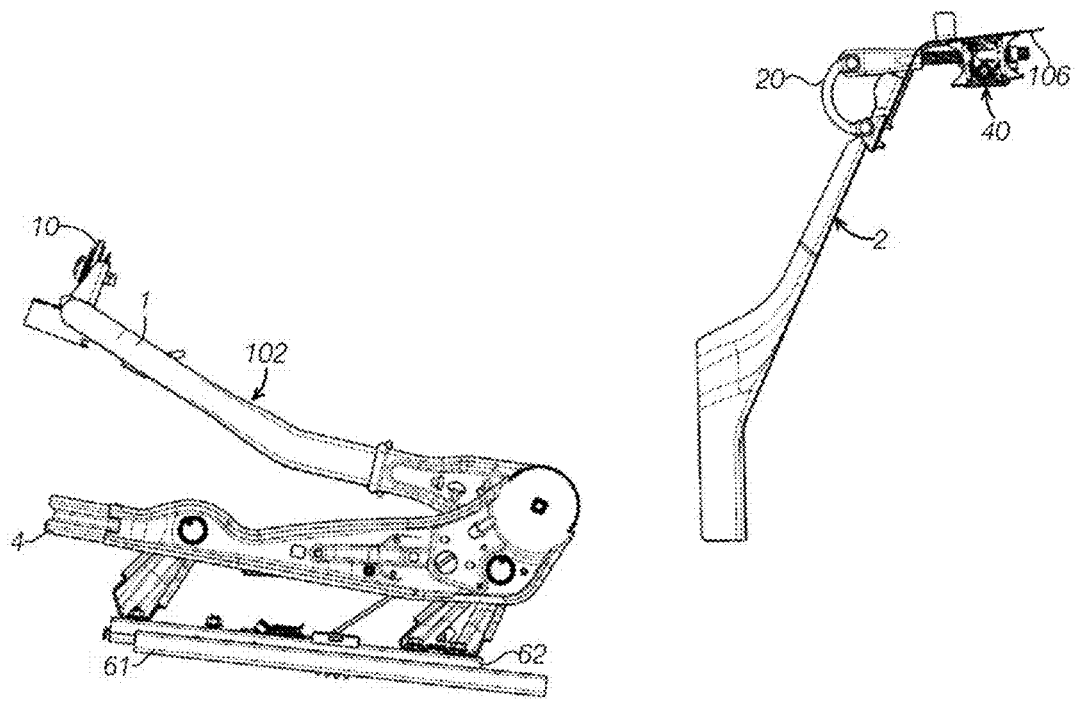
FIG. 6 is a schematic diagram of the rear seat of a vehicle in FIG. 5 at a folded position.

Referring to FIG. 6, when the strike 20 is released from the latch device 10, the seatback 1 is foldable relative to the bottom bracket 4 to provide more space for luggage and other items when the rear seat is not in use. To convert to a use position of the seat, the seatback is pulled up, the latch device 10 will hit the strike 20, which causes the strike 20 to open the hook-shaped tongue and enter the lock hole 13 such that the seatback 1 is locked or is at the use position.

FIG. 5 illustrates a state of the rear seat of the vehicle at the use position, that is, the seatback 1 is locked on the vehicle body 2, and the reclining angle of the seatback 1 is adjustable via the recline adjustment assembly 100 and/or sliding rail of the bottom bracket 4.

FIG. 6 illustrates a second position of the rear seat of the vehicle, that is, at a non-use position. At the non-use position, the latch device 10 and the strike 20 are separated. That is, the seatback 1 is unlocked from the vehicle body such that the seatback 1 can be rotated to a folded position. At the folded position, more storage room is available.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A recline adjustment assembly for a rear seat in a vehicle, comprising:
   a latch device disposed on a seatback of the rear seat; and
   a strike pivotally connected to a vehicle body is positioned behind the rear seat,
   wherein the strike is selectively locked in the latch device, and wherein the latch device moves along the strike to adjust a reclining angle of the seatback as the strike pivots.

2. The recline adjustment assembly of claim 1, wherein the strike is curved, in a plane substantially perpendicular to a main surface of the seat back and have both an upper end and a lower end facing the vehicle body, the first end of the strike is connected to the vehicle body via a first pivot, and the second end of the strike is connected to a driving device on the vehicle body via a second pivot.

3. The recline adjustment assembly of claim 2, wherein the driving device includes a motor fixed on the vehicle body and a worm connected with a worm gear on the motor.

4. The recline adjustment assembly of claim 3, wherein the worm is connected to the second pivot via a bushing, and wherein a bearing is disposed between the worm and the bushing.

5. The recline adjustment assembly of claim 1, wherein the latch device includes a base and a hook-shaped lock tongue pivotally connected to the base, and wherein the hook-shaped tongue and the base forms a lock hole for the strike to pass through.

6. The recline adjustment assembly of claim 5, wherein the lock hole extends substantially in a lengthwise direction of the seatback.

7. The recline adjustment assembly of claim 5, wherein the latch device further includes a release mechanism connected to the hook-shaped lock tongue to move the hook-shaped lock tongue open to release the strike.

8. The recline adjustment assembly of claim 1, wherein the latch device is disposed on a rear and top center portion of the seatback.

9. A rear seat in a vehicle, comprising:
   a bottom bracket moveable forward and back relative to a vehicle floor;
   a seatback connected to the bottom bracket via a hinge connection;
   a latch device disposed adjacent to a top and rear portion of the seatback;
   a strike pivotally connected to a vehicle body; and
   a driving device coupled to the strike, wherein the strike is received in the latch device at a use position of the rear seat, wherein the latch device slides along a length of the strike to adjust a reclining angle of the seatback as the strike pivots by the driving device.

10. The rear seat of claim 9, wherein the vehicle body includes a package tray of a rear window, wherein the strike has a curved shape protruded toward the seatback, and positioned at a plane substantially perpendicular to a main surface of the seatback, a first end of the strike is connected to a base on the package tray via a first pivot, and a second end of the strike is connected to the driving device disposed on the package tray via a second pivot.

11. The rear seat of claim 10, wherein the package tray includes an inner surface toward a vehicle floor, and wherein the driving device is disposed on the inner surface.

12. The rear seat of claim 11, wherein the driving device includes a motor fixed on the inner surface, a worm connected to a worm gear on the motor and a bushing connected to the worm via a bearing.

13. The rear seat of claim 12, wherein the bushing passes through a hole on the package tray to be connected with the second pivot.

14. The rear seat of claim 9, wherein the strike passes through the lock hole substantially in a direction of the vehicle height.

15. The rear seat of claim 9, wherein one of the vehicle floor and the bottom bracket includes a track extending in a longitudinal direction of a vehicle, and another one of the vehicle floor and the bottom bracket includes a rail, and wherein the rail is received in the track and slidable in the track.

16. A recline adjustment assembly for a rear seat in a vehicle, comprising:
   a latch device disposed on a seatback of the rear seat;
   a strike pivotally connected to a rear window package tray and received in the latch device at a use position; and
   a driving device to move the strike forward and backward at a longitudinal direction of the vehicle;
   wherein the latch device slides along a length of the strike to adjust a reclining angle of the seatback as the strike moves by the driving device.

17. The recline adjustment assembly of claim 16, wherein the driving device includes a motor, a worm gear on the motor and a worm engaged with the worm gear, wherein the strike has a U-shape that opens to the package tray, and wherein a lower end of the strike is connected to the package tray and an upper end is coupled to the warm of the driving device.

18. The recline adjustment assembly of claim 17, wherein the latch device is disposed adjacent to a top surface of the seatback and includes a hook-shaped lock tongue to receive and release the strike, wherein a base and the hook-shaped lock tongue form a lock hole to receive the strike, and wherein a central axis of the lock hole is substantially parallel to a main surface of the seat back.

19. The recline adjustment assembly of claim 18, wherein the reclining angle decreases as the latch device moves toward the upper end of the strike and the reclining angle increases as the latch device moves toward the lower end of the strike.

20. The recline adjustment assembly of claim 18, wherein the latch device includes a releasing mechanism to pull the strike out from the lock hole such that the rear seat is rotatable to a folded position.

\* \* \* \* \*